(12) United States Patent
Berry et al.

(10) Patent No.: US 8,793,179 B1
(45) Date of Patent: Jul. 29, 2014

(54) SYSTEMS AND METHODS FOR MANAGING A STORAGE LOCATION ASSOCIATED WITH AN EXCHANGE-TRADED FUND OF A PHYSICAL COMMODITY

(75) Inventors: Shawn Berry, East Sheen (GB); Anthony Jude Jew, Forest Hills, NY (US); Steven Ted Kern, Larchmont, NY (US); Timothy James Owens, London (GB); Neil Alan Clift, Guildford (GB)

(73) Assignee: JPMorgan Chase Bank, N.A., New York, NY (US)

( * ) Notice: Subject to any disclaimer, the term of this patent is extended or adjusted under 35 U.S.C. 154(b) by 186 days.

(21) Appl. No.: 13/277,680

(22) Filed: Oct. 20, 2011

Related U.S. Application Data

(60) Provisional application No. 61/425,148, filed on Dec. 20, 2010, provisional application No. 61/405,276, filed on Oct. 21, 2010.

(51) Int. Cl.
*G06Q 40/00* (2012.01)
*G06Q 10/08* (2012.01)
*G06Q 40/08* (2012.01)

(52) U.S. Cl.
CPC .............. *G06Q 40/00* (2013.01); *G06Q 10/083* (2013.01); *G06Q 40/08* (2013.01); *G06Q 10/08* (2013.01); *G06Q 10/08345* (2013.01)
USPC ................................................ 705/37; 705/4

(58) Field of Classification Search
CPC ....... G06Q 40/00; G06Q 40/08; G06Q 10/08; G06Q 10/08345; G06Q 10/083
USPC ...................................................... 705/37, 4
See application file for complete search history.

(56) References Cited

U.S. PATENT DOCUMENTS

| | | | |
|---|---|---|---|
| 5,671,364 A | 9/1997 | Turk | |
| 6,088,685 A | 7/2000 | Kiron et al. | |
| 6,907,402 B1 | 6/2005 | Khaitan | |
| 6,952,683 B1 | 10/2005 | Gerhard | |
| 7,130,825 B2 * | 10/2006 | Vlahoplus et al. | 705/37 |
| 7,409,366 B1 | 8/2008 | Amanat et al. | |
| 7,584,137 B2 | 9/2009 | Pham | |
| 7,769,674 B2 | 8/2010 | Bloom | |
| 8,234,190 B2 | 7/2012 | Spirgel et al. | |
| 8,326,720 B2 | 12/2012 | Spirgel et al. | |
| 8,332,292 B2 | 12/2012 | Spirgel et al. | |
| 2001/0032161 A1 * | 10/2001 | Thomas et al. | 705/36 |

(Continued)

OTHER PUBLICATIONS

DMCC: Excellent service in the complex world of commodities. (2007). Trade Finance, , 1. Retrieved May 29, 2014.*

(Continued)

*Primary Examiner* — Kito R Robinson
(74) *Attorney, Agent, or Firm* — Lowenstein Sandler LLP (57) ABSTRACT

A system and computer-implemented method for managing storage locations storing a physical commodity or physical commodities. According to an embodiment of the present invention, the method includes receiving data associated with the physical commodity such that the data includes an order of a specific number of lots of the physical commodity. The method also includes tracking one or more lots of the physical commodity stored in the storage location based on the specific number of the lots. The method further includes transforming the order into fractional shares based on the tracked one or more lots of the physical commodity and a geographic premium associated with the storage location.

30 Claims, 5 Drawing Sheets

(56) References Cited

U.S. PATENT DOCUMENTS

| | | | |
|---|---|---|---|
| 2001/0034688 | A1 | 10/2001 | Annunziata |
| 2002/0002532 | A1 | 1/2002 | Tso |
| 2002/0042770 | A1 | 4/2002 | Slyke et al. |
| 2002/0046154 | A1 | 4/2002 | Pritchard |
| 2002/0082903 | A1 | 6/2002 | Yasuzawa |
| 2002/0087454 | A1 | 7/2002 | Calo et al. |
| 2002/0120475 | A1* | 8/2002 | Morimoto .......................... 705/4 |
| 2002/0161692 | A1 | 10/2002 | Loh et al. |
| 2002/0198815 | A1 | 12/2002 | Greifeld et al. |
| 2003/0149652 | A1 | 8/2003 | Pham |
| 2003/0191708 | A1 | 10/2003 | Turk |
| 2004/0193530 | A1 | 9/2004 | Hausman |
| 2004/0199442 | A1 | 10/2004 | Haberle |
| 2004/0267655 | A1 | 12/2004 | Davidowitz et al. |
| 2005/0033672 | A1 | 2/2005 | Lasry et al. |
| 2005/0038726 | A1 | 2/2005 | Salomon et al. |
| 2005/0044022 | A1 | 2/2005 | Spirgel et al. |
| 2005/0171894 | A1 | 8/2005 | Traynor |
| 2005/0192889 | A1 | 9/2005 | Sauter et al. |
| 2006/0111999 | A1 | 5/2006 | Spirgel et al. |
| 2007/0179874 | A1 | 8/2007 | Spirgel et al. |
| 2007/0179875 | A1 | 8/2007 | Chiu |
| 2008/0249922 | A1* | 10/2008 | Kirch et al. ...................... 705/37 |
| 2009/0063366 | A1 | 3/2009 | Friedman et al. |
| 2009/0271328 | A1* | 10/2009 | Bloom ........................ 705/36 R |
| 2011/0055068 | A1 | 3/2011 | Spirgel |
| 2011/0112951 | A1 | 5/2011 | Gould |
| 2011/0215948 | A1* | 9/2011 | Borgerson et al. ............ 340/989 |
| 2011/0258102 | A1* | 10/2011 | Blasi ............................... 705/37 |
| 2012/0036059 | A1 | 2/2012 | Ionascu et al. |
| 2012/0166328 | A1 | 6/2012 | Spirgel |

OTHER PUBLICATIONS

Article titled "Benchmark MF Links Units to Gold Prices", Financial Express, May 10, 2002.
Alexandra Eadie, Article titled "Portfolio Canadian Fund Holds Silver Bullion", Globe and Mail, Nov. 20, 1990.
Nilanjan Dey, Article titled "Move to Launch Exchange—Traded Fund for Gold", Business Line, May 12, 2002.
Carlyle Dunbar, Article titled "On Stocks, Gold Shares are Still Worth Mining", Globe and Mail, Sep. 21, 1996.
Article titled "Now You Can Buy Gold on NSE", Times of Inda, May 16, 2002.
Neha Kapoor and Virendra Verma, Article titled "Equity Markets Attractive at Present 151 Mr. Sanjiv Shah, Executive Director, Benchmark Mutual Fund", Business Line, Aug. 19, 2002.
Carol Jouzaitis, Article titled "Cboe Traders Fear Creeping Computer", Chicago Tribune, Jul. 27, 1987.
Jonathan P. Hicks, "New Life for Copper Industry", The New York Times, Nov. 14, 1987.
Jim Wiandt and Will Mcclatchy, Book title "Exchange Traded Funds", 2002.
Article titled "Comex Copper Ends Shade Firmer, Lacks Fundamental News", Reuters News, Jul. 31, 2001.
Jim Wiandt, Article titled "ETF Regulatory and Tax Complications", Index Funds Advisors, Nov. 9, 2001, Article is an excerpt from the book Exchange Traded Fundsby Will McClatchy and Jim Wiandt,.
H.J. Phillips, Book titled Gold Assaying, 1904.

Descriptions of the book Exchange Traded Funds from Wiley.com and Amazon.com, Mar. 2013.
Swift.com page detailing the history of SWIFT, A timeline of the history of SWIFT from 1973 through 2012, Accessed Apr. 22, 2013.
Library of Congress Catalog Record for the book Exchange Traded Funds, Accessed Mar. 29, 2013.
Cynthia Crossen, Article titled "Your Money Matters: Surviving a Crash: Investors Find Options Limited for Safe- and Profitable-Havens", The Wall Street Journal, Jul. 23, 1987.
Burton G. Malkiel, Article titled Investors Shouldn't Fear 'Spiders', The Wall Street Journal, May 20, 2000.
SPDR S&P 500 ETF Trust, Form: S-6EL24/A; Filing No. 033-46080, Intelligize.com, Filed on Jan. 19, 1996; Printed on Mar. 25, 2013.
Rick Ferri, Article Titled "ETFs Turn 20-Years Old in the U.S.", Forbes, Jan. 17, 2013.
Webpage titled "The Laws that Govern the Securities Industry", Securities and Exchange Commission, Accessed Apr. 22, 2013.
Edgar Search Results for "SPDR S&P 500 ETF Trust", Securities and Exchange Commission. Accessed Apr. 22, 2013, Mar. 14, 2012.
Webpage titled "All SPDR ETFs", SPDRS.com, Accessed Apr. 22, 2013.
David Pottruck, Article titled "The Online Finance 40: Part 1 of 2", Institutional Investor Americas, Mar. 1, 2001.
Liam Pleven and Carolyn Cui, Article titled "Behind Gold's New Glister: Miner's Big Bet on a Fund", The Wall Street Journal, Nov. 25, 2010.
Article titled "Terra Nova Enables Traders to Trade Listed Stocks Through the Island Ecn", PR Newswire, Feb. 1, 2001.
James McAndrews and Chris Stefanadis, Article titled "The Emergence of Electronic Communications Networks in the U.S. Equity Markets", Current Issues in Economics and Finance, Oct. 2000.
SEC Post-Effective Amendment No. 4 to Form F-10, Central Fund of Canada Limited, Oct. 21, 1999.
Article titled "Investment News Central Fund", Globe and Mail, Jun. 22, 1987.
Ellen Roseman, Article titled "Forecast mixed for Metals Fund Investors", Globe and Mail, Jan. 22, 1988.
Terry Savage, Article titled "Is There Still Time to Cash in on Gold?", Chicago Sun Times, Jan. 28, 1990.
Lawrence J. Demaria, Article titled "A Convenient Bullion Storehouse", The New York Times, May 1, 1988.
Kenneth Hooker, Article titled "Gold a Hard-Times Holding", Long Beach Press-Telegram, Dec. 13, 1992.
Steve Halpern Knight, Article titled "Gold Prices Expected to Bounce Back", Lexington Herald-Leader, Jul. 10, 1994.
Sanjiv Shah, Benchmark Mutual Fund, Offer Document for Gold Benchmark Exchange Traded Scheme, May 2, 2002.
Webpage titled "About SEBI", Securities and Exchange Board of India, Accessed Apr. 22, 2013.
Sanjiv Shah, Scheme Initial Offer, May 2, 2002.
Gold Supply and Demand in Fourth Quarter 2004—World Gold Council briefing note.
Gold Supply and Demand in Fourth Quarter 2005—World Gold Council briefing note.
Adam Hamilton, Gold ETF Impact, Jun. 1, 2005.
Allen Sykora, "ETFs play Key role in rising gold investment demand", Jul. 30, 2011.

* cited by examiner

SYSTEMS AND METHODS FOR MANAGING A STORAGE LOCATION ASSOCIATED WITH AN EXCHANGE-TRADED FUND OF A PHYSICAL COMMODITY

CROSS-REFERENCE TO RELATED APPLICATION

This application claims the benefit of U.S. Provisional Patent Application No. 61/405,276 filed Oct. 21, 2010, the entire disclosure of which is hereby incorporated herein by reference and also claims the benefit of U.S. Provisional Patent Application No. 61/425,148 filed Dec. 20, 2010, the entire disclosure of which is hereby incorporated herein by reference.

FIELD OF THE INVENTION

The present invention relates generally to a method and system for managing a storage location for the physical commodity, and more particularly to a method and system for transforming data related to a physical commodity stored in a multiple storage locations into physical commodity-based exchange-traded funds (ETFs) for use in an investment product.

BACKGROUND OF THE INVENTION

Industrial demand for physical commodities is expected to escalate as emerging economies continue to grow. Generally, commodities used in commerce and industry are produced in locations that are different from locations at which they are consumed. These commodities therefore are subject to being transported from the production locations via the shipping locations to the consumption locations. This transportation requirement causes the cost of commodities, in each location, to be affected by the cost of insurance and storage of that location and the cost of freight from and/to other locations. Together with the above, localized differences in supply and demand of a commodity will affect the price at which that commodity is traded in each location. Also, the time required for transportation and the complexity of the logistics involved in transportation will affect the cost of commodities in a particular location.

A great mass and correspondingly large volume of physical commodities that carry a locational premium are generally needed to achieve a size/amount that is worth trading via an ETF if compared to precious metals, which are generally more expensive for a comparable mass and volume. So, the amount, expressed in weight, of such physical commodities that carry a locational premium represented by an ETF is larger, heavier and more difficult to transport and store in a storage location such as a warehouse, as compared with precious metals. Thus, it is noted that the locational/geographical premium of such a physical commodity, that is valued in large physical quantities, a function of the time, expense and logistical challenges of transportation due to the fact that the commodity is heavy and difficult to move around, and in certain cases can be damaged through poor handling or is otherwise perishable. Generally, the physical commodity is produced in one location, shipped to a storage location such as a warehouse, and then is later moved to a new storage location where it is actually going to be processed or utilized (i.e. the processing or manufacturing or consumption region). The value of the physical commodity might be much lower in a place where it is produced, mined or refined, which tends to be far away from places where it is actually being put into use in processing or manufacturing facilities, or where it may be consumed If a storage location full of the same physical commodity is located in or near a processing or manufacturing or consumption region, it is significantly more valuable to the end user due to the relative ease with which the commodity can be physically available for processing or manufacturing or consumption and the low costs involved. In this regard, the geographic location of the physical commodity can have a major impact on the price of the commodity.

U.S. Patent Publication No. 2005/0044022A1 provides systems and methods for securitizing a commodity, wherein a commodity trust is provided by a trustee for a particular commodity and commodity shares are backed by the trustee's custody of the actual commodity. Further, after confirmation of the receipt of the commodity, an amount of commodity shares is issued by the trustee, which is equal in value to the value of the commodity. In that patent application, however, the commodity is focused on precious metals or other similar products, which are more valuable in smaller quantities and can be easily transported to other locations and stored. The products covered are generally custodied, or stored, in one or few locations without accurately reflecting the quantity of the precious metals. Also, the prices of precious metals generally do not reflect locational premiums, or if they do reflect locational premiums, those locational premiums are not significant, because the mass and volume per dollar is very small as compared to the physical commodities with significant locational premiums. Generally, these precious metals are simply valued based on market prices that do not vary significantly by location.

Currently, an investor who is not a major participant in a physical commodity production, manufacturing or consumption process, for a particular commodity, can only invest in that physical commodity by either buying specific futures or selling specific futures that reference such commodity on an exchange. However, this type of investment may be inefficient, for a number of reasons, but in part due to the lack of such investor's ability to take delivery of or deliver the underlying commodity. Therefore, an investor would be required to continually trade out of one futures contract that is close to its maturity date and into another futures contract with a later maturity date in order to provide continuous exposure to the market, and might incur additional costs in such undertaking. Alternatively, the investor can invest in an index that replicates the performance of such a trading strategy in the futures, but may still end up with similar economic performance. Another material disadvantage of such a futures-based trading strategy is that the performance of the investment strategy is based on the prices of the futures contracts themselves rather than the price of the underlying commodity. These futures contract prices might differ from the spot value of the underlying commodity. These existing investment methods also do not reflect direct or indirect beneficial ownership of the underlying commodity but rather represent exposure to futures contracts on an unsecured obligation basis or secured by assets other than the physical commodity. This can sometimes introduce additional market dynamics that can affect the performance of the overall strategy.

Therefore, a need exists in the market to provide an ETF that offers an exposure to indirect ownership of the actual commodity, to facilitate a pure current exposure to the physical commodity, particularly for any physical commodity that involves geographical premium (i.e., a price more reflective of the actual value of the relevant commodity). Such physical commodities present associated challenges relating to the physical commodities that must be addressed in order to provide a cost-effective method for providing ETFs for investing in such physical commodities relative to the prior art methods.

Moreover, generally, the physical commodity stored at a storage location includes a certain number of lots which are owned by various owners. These lots have to be tracked and managed in order to convert them into ETF shares and to transfer ownership of the ETF shares from one owner to another. Therefore, a need exists in the market to provide for the efficient management of the storage location of the physical commodity in order to provide for the accurate and fair valuation of the ETF shares based on the physical commodity.

SUMMARY OF THE INVENTION

The present invention relates to a system and computer-implemented method configured to manage one or more storage locations storing one or more physical commodities in order to establish an exchange-traded fund (ETF) based on the physical commodities. In an embodiment of the present invention, the system and method provide for tracking units of a physical commodity having a plurality of owners stored in one or more storage locations. The system and the method provide for flexibility of delivery and storage of the physical commodity at various storage locations, the application of a geographical premium associated with the physical commodity and the creation and redemption of ETF shares, while making an accounting of the tracked physical commodity, geographical premium and current valuations of the ETF shares.

According to one embodiment of the present invention, the system and the method determines the value of the physical commodities.

According to another embodiment of the present invention, the system and the method to establish the ETF shares is based on the value of the physical commodity.

According to a further embodiment of the present invention there is provided a system and method for creating ETF shares of the physical commodities.

According to another embodiment of the present invention, there is provided a system and method for redeeming ETF shares of the physical commodities.

DEFINITIONS

"Authorized Participant"—A registered broker-dealer or other securities market participant such as a bank or other financial institution that has the authority to create and redeem Creation Units.

"Creation Unit"—A specific quantity of ETF shares of the Physical Commodity. This generally is used to indicate the units used in a Creation Order or Redemption Order.

"Creation Unit Ratio"—The ratio, calculated upon the close of business on each Exchange Business Day that reflects the weight (or number of measured units) of Physical Commodity required for creating a Creation Unit of a specific number of ETF shares on the following Exchange Business Day.

"ETF Market Maker"—Purchaser or Seller of Creation Units from an Authorized Participant; an ETF Market Maker would generally sell a Creation Unit of share it purchases from an Authorized Participant in the market for the shares or would generally purchase a Creation Unit of share in the market for the shares and then sell those shares to an Authorized Participant.

"Fractional Lots"—A fractional portion of a whole lot of the physical commodity that has been notionally divided into fractional portions through a book-entry procedure with each portion held at the relevant storage location with each such fractional portion having a different beneficial owner.

"Fractional Ownership Share"—A share of a fractional lot of the physical commodity.

"Geographical Premium"—A value, above or below a published benchmark level for the physical commodity, based on the relative location of the producers and consumers of the physical commodity (applying standard inputs for items such as freight, insurance and duties & customs that are consistent with applicable market conditions).

"Lot"—Whole lot and/or fractional lot.

"LME"—The London Metal Exchange or LME is the futures exchange with the world's largest market in options and futures contracts on physical commodities.

"NAV"—The net asset value calculated based on the value of the physical commodities.

"Ownership"—indicates the owner of the lot.

"Physical Commodity"—Commodity in physical form which conforms to acceptable delivery LME specifications.

"Relevant Creation Date"—Date on which the creation order is received.

"Relevant Creation Time"—Time at which the creation order is received.

"Relevant Redemption Date"—Date on which the redemption order is received.

"Relevant Redemption Time"—Time at which the redemption order is received.

"Trust"—A special purpose entity that is established to hold or store a particular commodity or commodities with a storage account, and to issue shares and/or receipts corresponding to the assets of the Trust.

"Storage Administrator"—a tool for tracking and managing lots and/or fractional lots of the physical commodity stored in the storage location.

"Storage Locations"—Locations that store the physical commodity from time to time.

"Storage Receipt"—a storage receipt issued by the storage administrator representing physical commodity delivered or held at the storage location.

Whole Lot"—Pre-defined parcels of the physical commodity of approximately consistent size/weight.

DETAILED DESCRIPTION OF THE INVENTION

The present invention is a system and method for managing storage locations associated with an ETF of a physical commodity or commodities.

In an embodiment of present invention, the system includes an ETF Market Maker Module that receives an order (e.g. purchase or redemption order) associated with a physical commodity. The physical commodities may include, for example, base metals, platinum group metals, plastics, agricultural products, etc. The physical commodity is stored in storage locations around the world. Some of these storage locations may be near a production/producer site, a shipping site, a manufacturing/processing/consumer site, etc. In one embodiment the order includes a specific number of lots of the physical commodity. As defined above, a lot is a whole lot and/or fractional lot. The system also includes a storage administrator that tracks the lots of the physical commodity stored in the storage location. The system further includes an authorized participant module that transforms the purchase or the redemption order based on the tracked lots and geographic premiums associated with the storage locations. The geographic premium is determined based on a cost of storing a number of lots of the physical commodity at the storage location and delivering the number of lots of the physical commodity to the storage location.

In another embodiment of the present invention, the order includes one or more shares of the ETF for the physical commodity. The authorized participant module functions to identify the relevant storage locations affected based on the order. The system also includes a valuation agent that determines a geographic premium associated with the identified storage location. The geographic premium is determined in a similar manner to that described above. The authorized participant module furthers generates a valuation of the physical commodity based on the geographic premium of the identified storage location. The system further includes an administrative agent module which presents the ETF based on the valuation of the physical commodity.

In a further embodiment of the present invention the system provides ETF shares related to physical commodities. The system includes a Trust Module for holding physical commodities in many different storage locations around the world for storing physical commodities. The Administrative Agent Module further functions to calculate a net asset value of the stored physical commodity at each separate location. This net asset value is calculated on a daily basis based on several factors such as the geographical premium of the commodity, provided by a third party, inventory of the amount of physical commodity at each location, the relevant benchmark price of the commodity (for example, LME official closing levels), and accrued liabilities of the Trust, etc. The physical commodity holdings of the Trust will be updated based on the execution of creation and/or redemption orders of ETF shares. The Administrative Agent Module further calculates and publishes a Creation Unit Ratio. This Creation Unit Ratio essentially is the weight (or number of units) of the physical commodity that corresponds to each ETF share. It is noted that this weight (or number of units) of the physical commodity for each ETF share is generated on each Exchange Business Day. The Creation Unit Ratio is calculated by dividing the aggregate weight (or number of units) of the physical commodity available to the Shareholders of the Trust (i.e., excluding the relevant weight (or the relevant units) subject to any lien for expenses accrued) by the number of outstanding shares of the ETF. The Creation Unit Ratio for the ETF is used by the Trustee to quantify the amount of physical commodity required for an amount of shares to be either created or redeemed. The ETF shares can be created and redeemed by the Authorized Participant Module by generating a creation order or a redemption order, respectively. Both these orders are generated based on several factors such as type of physical commodity, whether the commodity meets certain specifications, number of ETF shares to be created/redeemed, delivery of the physical commodity to a specific storage location, etc.

Figure 1:
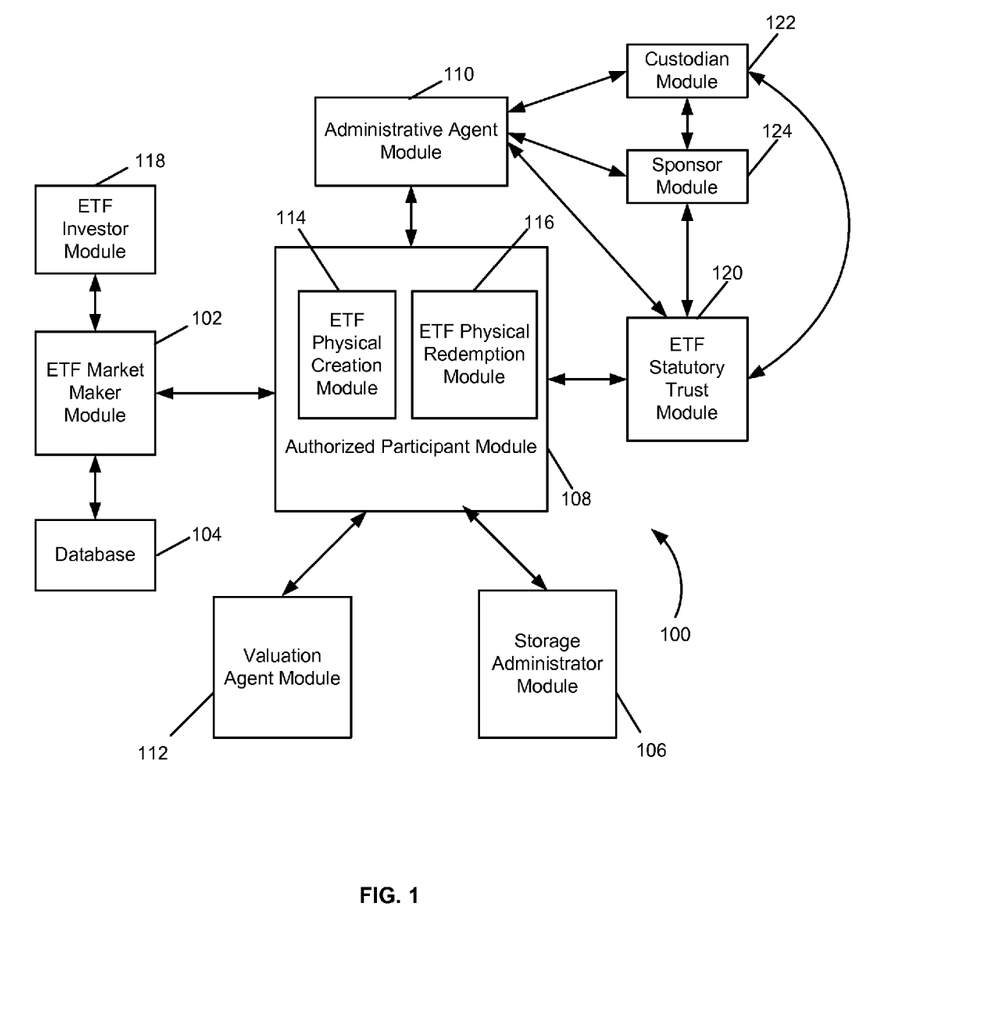
FIG. 1 is a system for managing storage locations associated with an ETF of the physical commodity stored in the storage locations in accordance with an embodiment of the present invention.

An exemplary system for managing storage locations of physical commodities in accordance with above embodiments of the present invention is illustrated in FIG. 1, herein as system 100. It should be noted that the system 100 illustrated in FIG. 1 is a computer-based system which is provided to assist in demonstrating the novel aspects of the present invention and is not presented for purposes of limitation. The term 'computer' is intended to include any data processing device, such as a desktop computer, a laptop computer, a mainframe computer, a personal digital assistant, a server, a handheld device, or any other device configured to process data. The term 'computer module' is intended to include, but is not limited to, one or more computers configured to execute one or more software programs configured to perform one or more functions. The term 'communicatively connected' is intended to include, but is not limited to, any type of connection, whether wired or wireless, in which data may be communicated, including, for example, a connection between devices and/or programs within a single computer or between devices and/or programs on separate computers. According to an embodiment of the present invention, the components of the system 100 may each be a computer module particularly configured to perform the function associated with the respective component. The features and the functionality of the system 100 and its components are described in detail in connection with the system diagram of FIG. 1 and the process flow diagrams of FIG. 2, FIG. 3, FIG. 4, FIG. 5, FIG. 6 and FIG. 7.

With reference to FIG. 1, the system 100 is comprised of an ETF Market Maker Module 102 configured to receive data associated with the physical commodity. In one embodiment the data includes an order of a specific number of whole lots and/or fractional lots of the physical commodities. The physical commodities may include, for example, base metals, platinum group metals, plastics, agricultural products, etc. The system 100 includes a database 104 coupled to the ETF Market Maker (ETFMM) Module 102 for storing the data including the purchase and redemption orders. The system 100 also includes a Storage Administrator (SA) Module 106 communicatively connected to the ETFMM 102. The SA Module 106 is configured to track whole lots and/or fractional lots of the physical commodity stored in the storage location based on the specific number of whole lots and/or fractional lots. The system 100 also includes an Authorized Participant (AP) Module 108 communicatively connected to the SA Module 106 and configured to transform one of the purchase order and the redemption order into fractional ownership shares. The system 100 also includes an Administrative Agent (AA) Module 110 communicatively connected to the Authorized Participant Module 108. The AA Module 110 is configured to assign the fractional ownership shares of the physical commodity in the storage location without physically moving the physical commodity. The system 100 further includes a Valuation Agent (VA) Module 112 coupled to the AP Module 108 and is configured to determine geographic premiums associated with the storage locations.

In another embodiment, the data includes one of a purchase order or a redemption order for one or more ETF shares for the physical commodity. The AP module 108 is also configured to identify the storage location based on the data and generate a valuation of the physical commodity. The AP Module 108 includes an ETF Creation Module 114 which functions to create ETF shares through the ETF share purchase order for ETF shares relating to the physical commodity. The AP Module 108 also includes an ETF Redemption Module 116 which functions to redeem ETF shares through the ETF share redemption order for ETF shares relating to the physical commodity. It is noted that the creation orders and the redemption orders for ETF shares relating to the physical commodity may preferably occur physically, i.e. with the delivery or receipt of the physical commodity in whole lots and/or fractional lots for the share(s) as described in greater detail below. Further, the AA module 110 communicatively connected to the AP Module 108 functions to present the ETF based on the valuation of the physical commodity.

In a further embodiment, the system 100 of FIG. 1 includes an ETF Investor Module 118 communicatively connected to ETF Market Maker Module 102. The ETF Investor Module 118 is configured such that creation and redemption ETF orders are placed by the ETF Market Maker Module 102. The Authorized Participant (AP) Module 108 is communicatively connected to the ETF Market Maker Module 102 and configured to receive and process the request for creation and/or redemption orders with the ETF. As discussed above, the AP Module 108 includes the ETF Creation Module 114 and the ETF Redemption Module 116. The ETF Creation Module 114 functions to create ETF shares through the ETF share creation order for ETF shares relating to the physical commodity. The ETF Redemption Module 112 functions to redeem ETF shares through the ETF share redemption order for ETF shares relating to the physical commodity. It is noted that the creation orders and the redemption orders for ETF shares relating to the physical commodity may preferably occur physically, i.e. with the delivery or receipt of the physical commodity in the weight (or unit size requirement) for the share(s) as described in greater detail below. The system 100 also includes an ETF Statutory Trust Module 120 communicatively connected to the AP Module 108 and to the AA Module 110. The system 100 further includes a Custodian Module 122 and a Sponsor Module 124 both of which are communicatively connected to each other, to the AA Module 110 and to the ETF Statutory Trust Module 120. It is noted that the number of modules and their respective names in system 100 are provided simply for the purpose of describing the invention and are not limited in any way or form. The functions of each of the modules are described in greater detail below.

Figure 2:
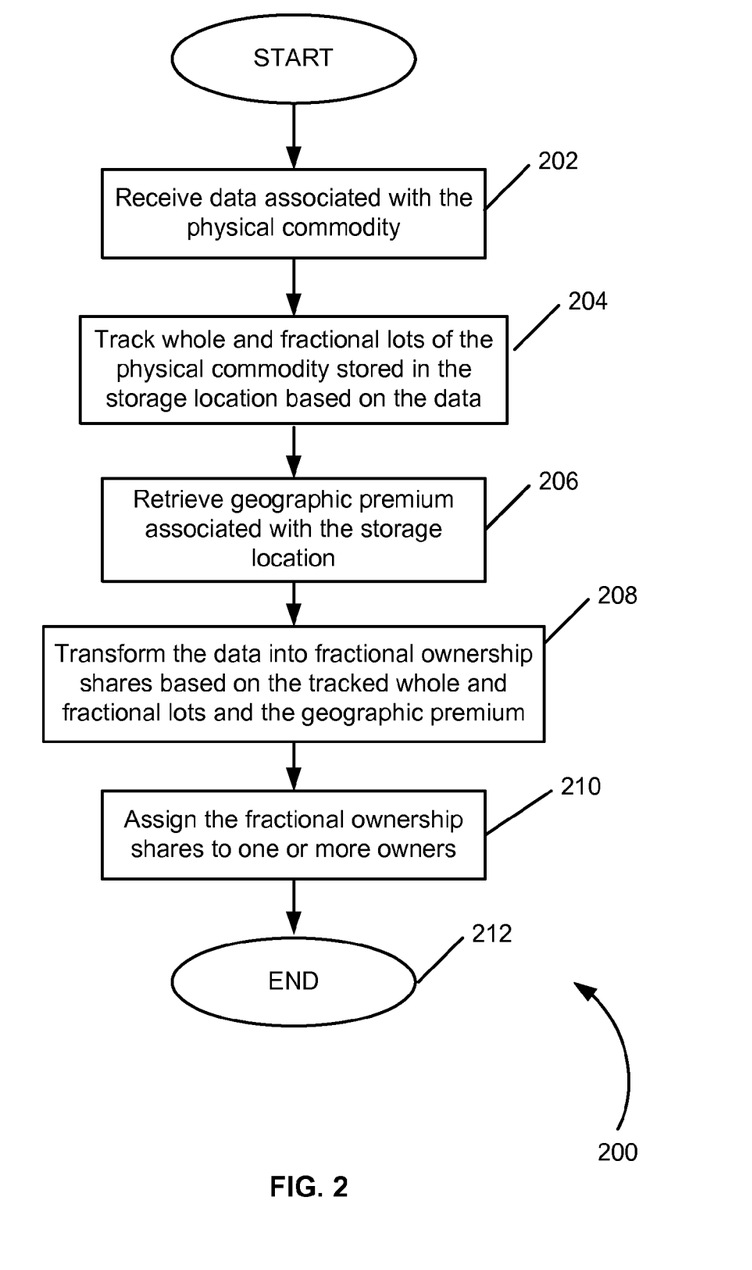
FIG. 2 is a process flow diagram illustrating an exemplary method for managing storage locations of physical commodities in accordance with an embodiment of the present invention.

Referring to FIG. 2, there is an exemplary method 200 for managing storage locations of the physical commodities in accordance with an embodiment of the present invention. Initially, at step 202, the ETFMM Module 102 receives data associated with the physical commodity and sends the data to the AP Module 108. The data includes, but is not limited to one of a purchase order (herein the "purchase order data") and a redemption order (herein the "redemption order data") of a specific number of the whole lots and/or the fractional lots of the physical commodity. The SA Module 105 in step 204 tracks the whole lots and/or the fractional lots of the physical commodity stored in the storage location based on the specific number of the whole lots and/or the fractional lots in one of the purchase order data and redemption order data. The whole lots and/or the fractional lots are co-owned by a plurality of owners.

In step 206, the AP Module 108 retrieves geographic premium associated with the storage location from the Valuation Agent Module 112. The geographic premium will be described in greater detail with reference to FIG. 3 below. In step 208, the AP Module 108 transforms one of the purchase order data and redemption order data into fractional ownership shares based on the tracked whole and/or fractional lots of the physical commodity and the geographic premium associated with the storage location. The AP Module 108 generates a valuation of the tracked whole and/or fractional lots of the physical commodity based on the geographic premium, and the valuation is used to determine the price/value of the specific number of whole and/or fractional lots in the purchase order data or the redemption order data. In step 210, the AA Module 110 assigns the fractional ownership shares to one or more owners. It is noted that the shares are assigned without moving the physical commodity.

Figure 3:
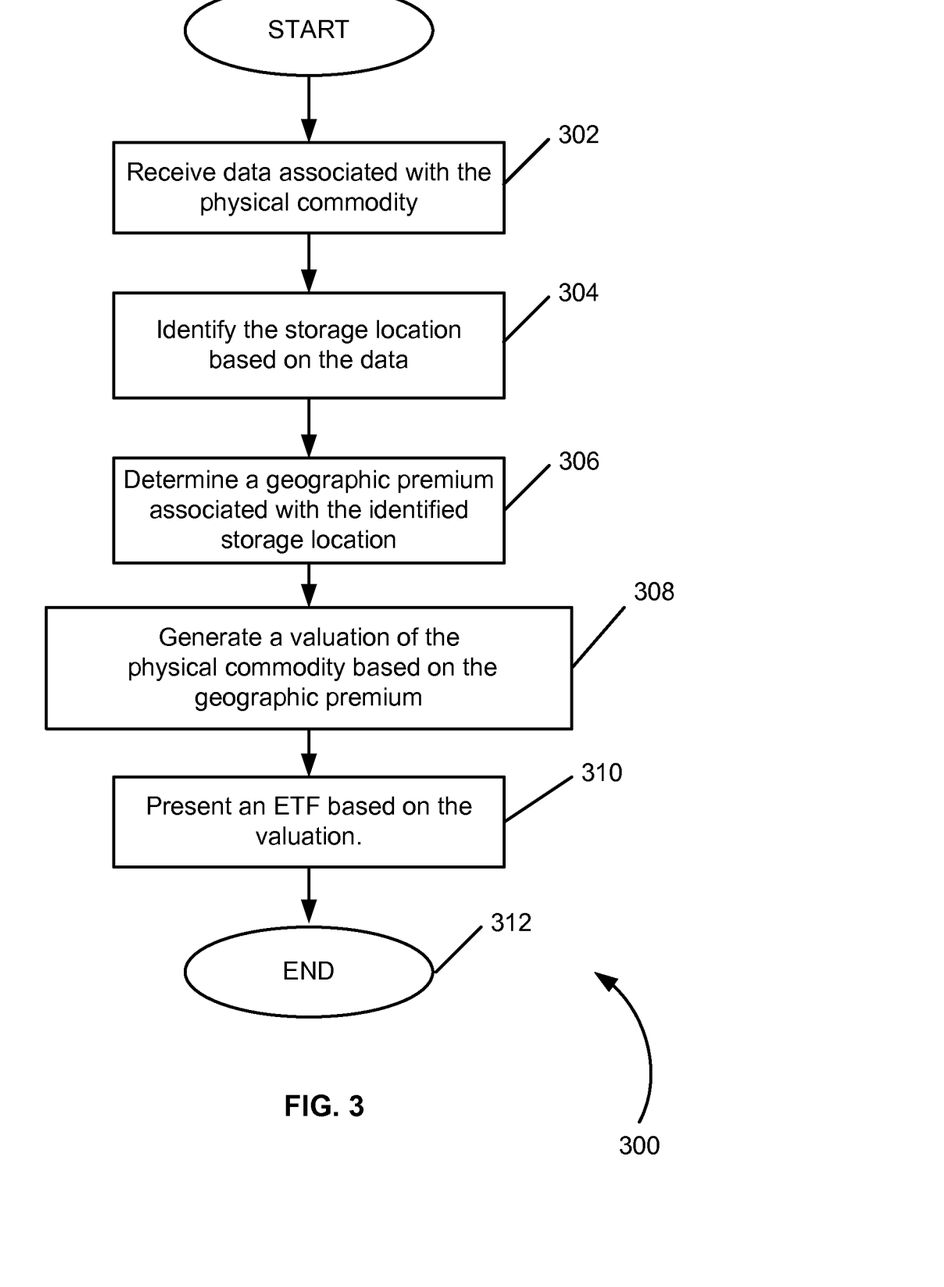
FIG. 3 is a process flow diagram illustrating an exemplary method for managing storage locations of physical commodities in accordance with another embodiment of the present invention.

FIG. 3 illustrates a method 300 for managing storage locations of the physical commodities in accordance with an embodiment of the present invention. Initially, at step 302, the ETFMM Module 102 receives data associated with the physical commodity and sends it to the AP Module 108. The data may include but is not limited to one of a purchase order or a redemption order for one or more shares of the ETF for the physical commodity. At step 304, the AP Module 108 identifies the storage location based on the data. The VA 110 at step 306 receives the identified storage location and determines a geographic premium associated with the identified storage location. The geographic premium is determined based on a cost computed for storing and/or delivering of a number of whole and/or fractional lots of the physical commodity stored in the identified storage location. At step 308, AP Module 108 receives the geographic premium and generates a valuation of the physical commodity based on the geographic premium of the identified storage location. At step 310, the AA Module 110 receives the valuation of the physical commodity from the AP Module 108 and presents an ETF based on the valuation. The ETF is presented to one or more owners. The valuation of the physical commodity is used to determine the price/value of the ETF in one of the purchase order or the redemption order.

Figure 4:
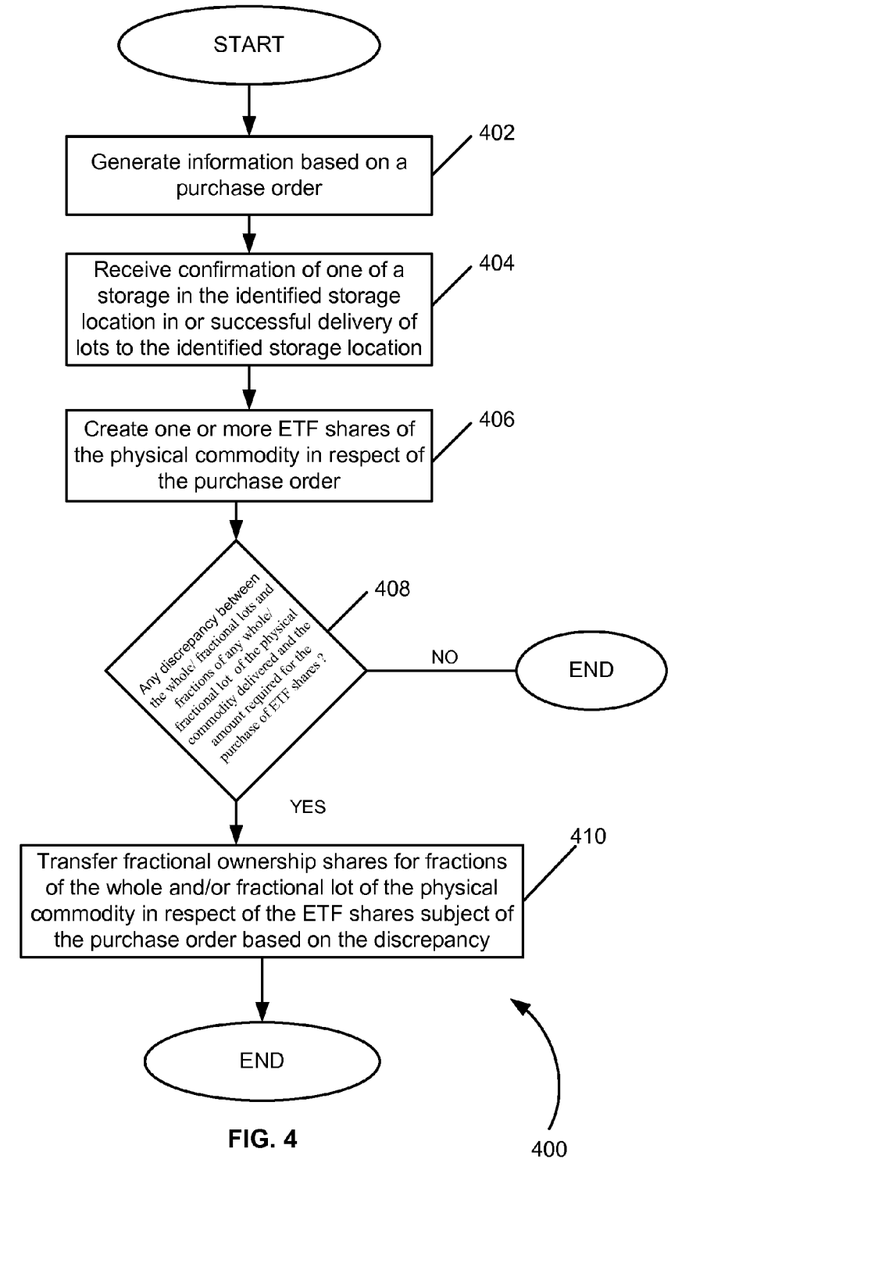
FIG. 4 is a process flow diagram illustrating an exemplary method for managing storage locations of the physical commodities when the data associated with a physical commodity in FIG. 3 is a purchase order for one or more shares of the ETF for the physical commodity.

Referring to FIG. 4, there is illustrated a process flow diagram 400 for managing storage locations of the physical commodities when the data associated with a physical commodity in step 302 of FIG. 3 is a purchase order for one or more shares of the ETF for the physical commodity. Initially, at step 402, information is generated by the AP module 108 based on the purchase order. The information includes but is not limited to one of a number of whole and/or fractional lots of the physical commodity stored in the identified storage location and a number of whole and/or fractional lots of the physical commodity to be delivered to the identified storage location. The whole and/or fractional lots of the physical commodity to be delivered may be in either a Physical or other type of exchange warrant format, etc. The 'Physical format' is as an actual delivery of the physical commodity at the identified storage location. The 'Exchange Warrant format' is an authorized certificate provided by a commodity exchange market such as LME for a number of whole lots of the physical commodity in the identified storage location. After a specific time period, at step 404, a confirmation is received by the AP Module 108 of one of the storage of number of whole and/or fractional lots of the physical commodity at the identified storage location or the successful delivery of the number of whole and/or fractional lots to the identified storage location. At step 406, one or more ETF shares of the physical commodity are created by the AP Module 108 for the purchase order. At step 408, the AP Module 108 determines if there is any discrepancy between the whole and/or fractional lots and fractions of any whole and/or fractional lot of the physical commodity delivered and the amount required for the purchase of ETF shares. If at step 408 it is determined that there is no discrepancy, the process flow ends. If at step 408 it is determined that there is a discrepancy, then at step 410 fractional ownership shares for the fractions of the whole and/or fractional lot of the physical commodity based on the discrepancy are transferred in respect of the ETF shares created for the purchase order. It is noted that the delivery of the whole lots will always be from the AP Module 108 to the ETF Statutory Trust Module 120, however, the delivery of the fractional lots (if applicable) can be either from or to the AP Module 108 as the AP Module 108 may have over-delivered or under-delivered the amount of physical commodity by means of instructing to move the whole lots to the ETF Statutory Trust Module 120 pursuant to the purchase order.

Figure 5:
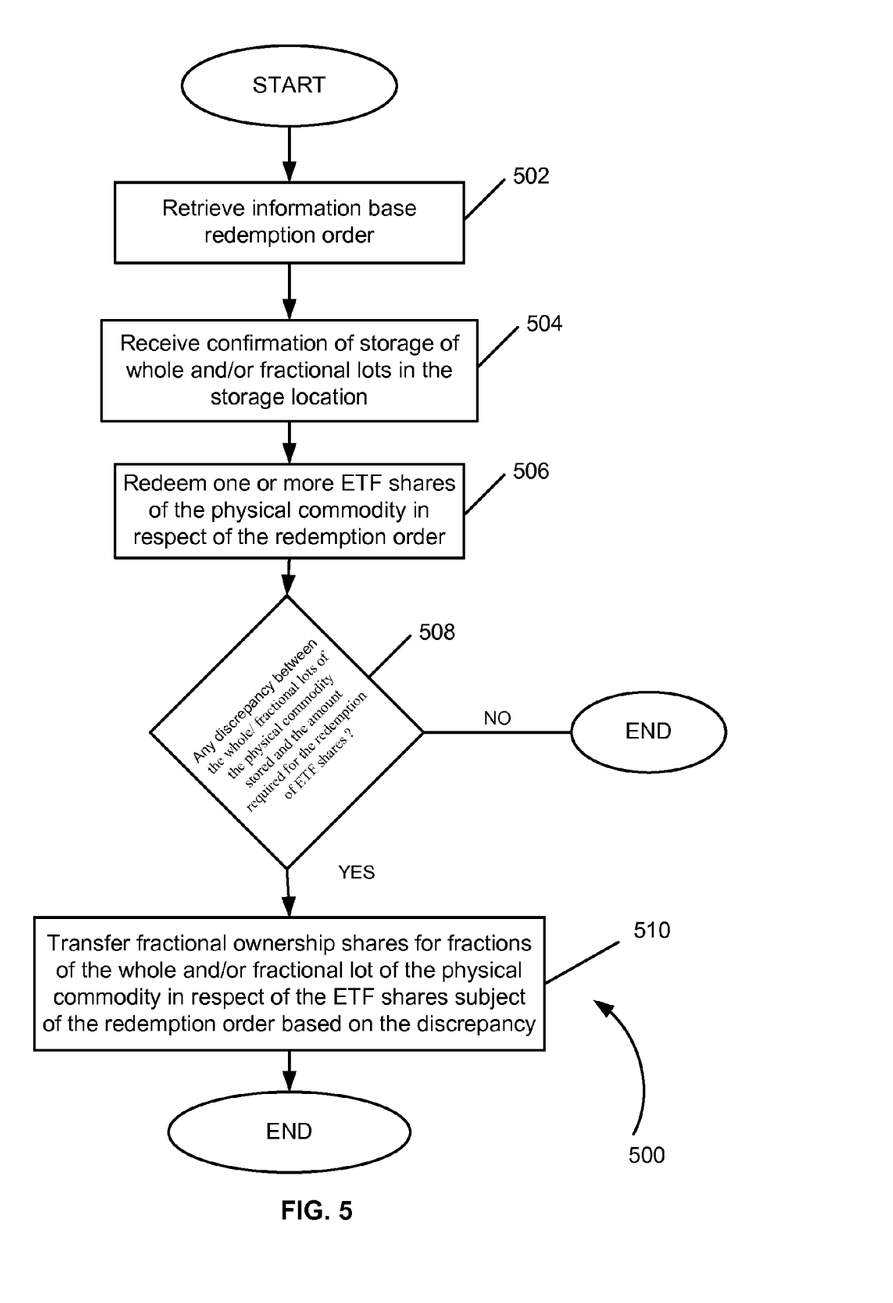
FIG. 5 is a process flow diagram illustrating an exemplary method for managing storage locations of the physical commodities when the data associated with physical commodity in FIG. 3 is a redemption order for one or more shares of the ETF for the physical commodity.

Referring to FIG. 5, there is illustrated a process flow diagram 500 for managing storage locations of the physical commodities when the data associated with the physical commodity in step 302 of FIG. 3 is a redemption order for one or more shares of the ETF for the physical commodity. Initially, at step 502, information is retrieved by the AP Module 108 based on the redemption order. The information includes, but is not limited to, one of a number of ETF shares to be redeemed and/or a number of the whole and/or fractional lots of the physical commodity. After a specific time period, at step 504, a confirmation is received by the AP Module 108 from the ETF Trust Module 120 of storage of the number of whole and/or fractional lots of the physical commodity at the storage location. At step 506, one or more ETF shares of the physical commodity are redeemed by the AP Module 108 in respect of the redemption order. At step 508, the AP Module 108 checks to see if there is any discrepancy between the whole and/or fractional lots of the physical commodity stored in the storage location and the amount required for the redemption of the ETF shares. If at step 508, it is determined that there is no discrepancy, the process flow ends. If at step 508, it is determined that there is a discrepancy, then at step 510 fractional ownership shares for fractions of the whole and/or fractional lots of the physical commodity based on the discrepancy are transferred in respect of the ETF shares (of the whole and/or fractional lots) redeemed for the redemption order.

It is noted that the information generated and/or retrieved by the AP Module 108 as noted above based on the purchase order and the redemption order may utilize a physical commodity selection methodology. It is noted that the example used as the physical commodity herein is a base metal such as Copper; however, one of ordinary skill in the art would recognize that other physical commodities would be applicable to the process of creating and/or redeeming ETF shares. The methodology provides detail to the Authorized Participant Module 108 and the Administrative Agent Module 110 as to which lot(s) of copper are to be delivered and in what order from the ETF Statutory Trust Module 120 to the Authorized Participant Module 108 upon a redemption order. The criteria for this methodology is primarily based on the lot(s) held in the cheapest to deliver storage location (or next cheapest to deliver storage location) at the time of the redemption. It is noted that if there is more than one storage location with the same lowest geographical premium, there is a mechanism established to resolve such situations. Such a mechanism may preferably be a specific rule, based mechanism known to one in ordinary skill in the art. The secondary criteria may include the lot(s) held in the cheapest to deliver storage location with the lowest absolute weight. Other criteria may include whether a brand of copper has been discontinued as being acceptable for LME deliveries and which lots were received first by the Trust.

It is noted that the above criteria of redeeming ETF shares is specific to Copper and may not be applicable to other commodities. In order to redeem shares of other physical commodities besides Copper, some of the factors may include, but are not limited to, number of months/years the commodity has been stored in the storage location, perishability or other conditions of the commodity.

According to an embodiment of the present invention, the amount of Physical Copper for a creation or redemption is equal to the product of (i) the standard weight of a lot of Copper, (ii) the number of Creation Units and (ii) the Creation Unit Ratio per share of the Trust calculated by the Administrative Agent Module 110 for the relevant creation or redemption time and date. It is further noted that the ETF Statutory Trust Module 120 delivers to the Authorized Participant Module 108 an amount of physical commodity or a corresponding number of storage receipts, such amount determined by the Administrative Agent Module 110 using the Creation Unit Ratio of the Trust on the relevant redemption time and date.

The process for calculating Net Asset Value is described herein below. The ETF Statutory Trust Module 120 publishes geographic premium levels (provided by the third party) preferably on a daily basis. For example, the third party may regularly value physical commodities such as a base metal, Copper, and regularly obtain prices from a variety of market participants for the premiums for a prescribed amount of the physical copper of the required grade in each location at which the ETF holds physical commodity. It is noted that the example used as the physical commodity is Copper; however, one of ordinary skill in the art would recognize that other physical commodities such as mentioned above would be applicable to this mechanism of generating Net Asset Value (NAV). The Administrative Agent Module 110 receives from the Custodian Module 122, on a daily basis, the complete inventory of Copper lots (including fractional ownerships). On a daily basis the Administrative Agent Module 110 takes the LME Official Closing level (price in US Dollars per metric tonne) and using this information together with geographic premiums provided by the third party, the Administrative Agent Module 110 calculates and publishes a Gross Asset Value of the Trust on a daily basis. The Administrative Agent Module 110 then calculates and publishes a Net Asset Value of the Trust taking into account all accrued liabilities of the Trust. The Administrative Agent Module 110 calculates and publishes a Creation Unit Ratio. This shall be used by all stakeholders to understand the amount of Copper (in metric tonnes) required, on any specific day, for an amount of shares to be either created or redeemed. Intraday ticking prices are required to be published to the Exchange. This may be done preferably in reference to the LME spot price changes with all other factors of the Net Asset Value being static for the day.

It is noted that denominating what is required for a creation or redemption as an amount of physical commodity in the cheapest to deliver location, together with the Copper Selection Methodology, prevents the arbitrage of the simultaneous creation and redemption of fungible ETF shares to profit from unequal prices of the physical commodity in different storage locations. This differential is mainly due to the geographic premium. For example, the ETF shares of the physical commodity created at one storage location (ex: production site) cannot be redeemed the next day at a different storage location (ex: manufacturing site) where the physical commodity is more valuable.

In addition to calculating the Net Asset Value (NAV) of the Trust, the Administrative Agent Module 110 also calculates the accrued expenses of the ETF and further instructs the Sponsor Module 124 to pay the expenses on behalf of the ETF Statutory Trust Module 120 on a relevant payment date. The Administrative Agent Module 110 also credits to the payable account in respect of the Sponsor Module 124 (amount owed by the ETF Statutory Trust Module 120) the amount paid. On any Business Day, when the amount owed to the Sponsor Module 124 reflected in the relevant payable account, as determined by the Administrative Agent Module 110, is equal to or higher than the value (using the aggregate of the LME spot plus geographic premium utilized in the determination of the NAV) of one lot of copper, using the Copper Selection Methodology, then the Administrative Agent Module 110 instructs the Custodian Module 122 to deliver to the beneficial ownership of the Sponsor Module 124 that amount of lot(s) from the ETF Statutory Trust Module 120. Such transfers are preferably not done in partial lots. The Custodian Module 122 confirms the transfer of the ownership of the lots to both the Administrative Agent Module 110 and the Sponsor Module 124. It is noted that the examples used above of the physical commodity is a base metal, Copper, however, one of ordinary skill in the art would recognize that other physical commodities such as mentioned above would be applicable to this calculation of the accrued expenses of the ETF.

The description provided herein discloses principles of the present invention, which are presented for purposes of illustration and not by way of limitation. Various modifications can be made by those skilled in the art without departing from the spirit and scope of the invention described herein.

What is claimed is:

1. A computer-implemented method for managing a storage location of a physical commodity comprising:
    receiving, by a processing device, data associated with the physical commodity, wherein the data comprises an order of a specific number of at least one or more lots of the physical commodity;
    tracking, by the processing device, at least one or more lots of the physical commodity stored in the storage location based on the specific number of the at least one or more lots in the order, wherein the at least one or more lots are owned by a plurality of owners; and transforming, by the processing device, the order into fractional ownership shares based on the tracked at least one or more lots of the physical commodity and a geographic premium associated with the storage location, wherein the geographic premium is based on cost of one of a storage of one or more lots of the physical commodity in the storage location and delivery of the one or more lots of the physical commodity to the storage location.

2. The computer-implemented method of claim 1 wherein the at least one or more lots comprise one of whole lots or fractional lots.

3. The computer-implemented method of claim 1 wherein the order is at least one of a purchase order or a redemption order.

4. The computer-implemented method of claim 1 further comprising assigning the fractional ownership shares of the physical commodity stored in the storage location, without physically moving the physical commodity.

5. The computer-implemented method of claim 1 further comprising generating a valuation of the tracked at least one or more lots of the physical commodity based on the geographic premium.

6. A system for managing storage location of a physical commodity, the system comprising:
    a memory;
    a processing device coupled to the memory to:
    receive data associated with the physical commodity, wherein the data comprising an order of a specific number of at least one or more lots of the physical commodity; and
    track at least one or more lots of the physical commodity stored in the storage location based on the specific number of the at least one or more lots in the order, wherein the at least one or more lots are owned by a plurality of owners; and
    transform the order into fractional ownership shares based on the tracked at least one or more lots of the physical commodity and a geographic premium associated with the storage location, wherein the geographic premium is based on cost of one of a storage of one or more lots of the physical commodity in the storage location and delivery of the one or more lots of the physical commodity to the storage location.

7. The system of claim 6 wherein the at least one or more lots comprise one of whole lots or fractional lots.

8. The system of claim 6 wherein the order is at least one of a purchase order or a redemption order.

9. The system of claim 6 wherein the processing device to assign the fractional ownership shares of the physical commodity stored in the storage location without physically moving the physical commodity.

10. A computer-implemented method for managing a storage location of a physical commodity comprising:
    receiving, by a processing device, data associated with the physical commodity;
    identifying, by the processing device, the storage location based on the data;
    determining, by the processing device, a geographic premium associated with the identified storage location, wherein determining the geographic premium comprises one of computing a cost for storing the physical commodity in the identified storage location and computing a cost for delivering the physical commodity to the identified storage location;
    generating, by the processing device, a valuation of the physical commodity based on the geographic premium of the identified storage location; and
    presenting, by the processing device, an exchange-traded fund (ETF) based on the valuation of the physical commodity.

11. The method of claim 10, wherein the data comprises a purchase order for one or more shares of the ETF for the physical commodity.

12. The method of claim 11 further comprising generating information based on the purchase order, wherein the information comprises one of a number of at least one or more lots of the physical commodity stored in the identified storage location and a number of at least one or more lots of the physical commodity to be delivered to the identified storage location.

13. The method of claim 12 wherein the at least one or more lots comprise one of whole lots or fractional lots.

14. The method of claim 12 wherein determining the geographic premium comprises one of computing a cost for storing the number of at least one or more lots of the physical commodity in the identified storage location and computing a cost for delivering the number of at least one or more lots of the physical commodity to the identified storage location.

15. The method of claim 14, wherein the delivery of the physical commodity comprises one of a physical format and an exchange warrant format.

16. The method of claim 15, wherein the physical format comprises delivery of the number of at least the one or more lots of the physical commodity at the identified storage location.

17. The method of claim 15, wherein the exchange warrant format comprises an authorized certificate for the number of at least one or more lots of the physical commodity stored in the identified storage location.

18. The method of claim 14 further comprising creating one or more ETF shares upon receipt of confirmation of one of the storing of the physical commodity at the identified storage location and the delivering of the physical commodity to the identified storage location.

19. The method of claim 10, wherein the data comprises a redemption order for one or more shares of the ETF for the physical commodity.

20. The method of claim 19 further comprising generating information based on the redemption order, wherein the information comprises one of a number of the ETF shares to be redeemed and a number of at least one or more lots of the physical commodity stored in the storage location.

21. The method of claim 20 wherein the at least one or more lots comprise one of whole lots or fractional lots.

22. The method of claim 21, wherein determining the geographic premium comprises computing a cost for storing the number of at least one or more lots of the physical commodity at the storage location.

23. The method of claim 22 further comprising redeeming the one or more ETF shares upon receipt of confirmation of the storage of the physical commodity at the storage location.

24. A system for managing the storage location of a physical commodity, the system comprising:
   a memory;
   a processing device coupled to the memory to:
   receive data associated with the physical commodity;
   identify the storage location based on the data;
   determine a geographic premium associated with the identified storage location, wherein the authorized participant module is further configured to generate a valuation of the physical commodity based on the geographic premium of the identified storage location, wherein the determine of the geographic premium comprises one of compute a cost for storing the physical commodity in the identified storage location and compute a cost for delivering the physical commodity to the identified storage location; and
   present the ETF based on the valuation of the physical commodity.

25. The method of claim 24, wherein the geographic premium is based on one of a cost for storage of the physical commodity at the identified storage location and the cost of delivery of the physical commodity to the identified storage location.

26. The system of claim 25, wherein the data comprises a purchase order for one more shares of the ETF for the physical commodity.

27. The system of claim 26, wherein the processing device to receive the purchase order data and create one or more shares of the ETF for the physical commodity upon receipt of confirmation of one of the storage of the physical commodity at the identified storage location and the delivery of the physical commodity to the identified storage location.

28. The system of claim 26 wherein the data comprises a redemption order for one or more shares of the ETF for the physical commodity.

29. The system of claim 28 wherein the processing device to receive the redemption order data and redeem the one or more ETF shares upon receipt of confirmation of the storage of the physical commodity at the storage location.

30. The system of claim 28 wherein the processing device to track the physical commodity stored in the identified storage location.

* * * * *